US012588054B2

(12) United States Patent
He et al.

(10) Patent No.: US 12,588,054 B2
(45) Date of Patent: Mar. 24, 2026

(54) HALF-DUPLEX PERIODIC MESSAGE TRANSMISSION METHOD, TERMINAL AND STORAGE MEDIUM

(71) Applicant: ZTE Corporation, Shenzhen (CN)

(72) Inventors: Wei He, Shenzhen (CN); Hongyu Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 396 days.

(21) Appl. No.: 18/034,728

(22) PCT Filed: Nov. 9, 2021

(86) PCT No.: PCT/CN2021/129611
§ 371 (c)(1),
(2) Date: May 1, 2023

(87) PCT Pub. No.: WO2022/127448
PCT Pub. Date: Jun. 23, 2022

(65) Prior Publication Data
US 2023/0403735 A1      Dec. 14, 2023

(30) Foreign Application Priority Data

Dec. 15, 2020    (CN) .......................... 202011480289.3

(51) Int. Cl.
*H04W 72/566* (2023.01)
*H04L 5/16* (2006.01)

(52) U.S. Cl.
CPC ............. *H04W 72/569* (2023.01); *H04L 5/16* (2013.01)

(58) Field of Classification Search
CPC ............... H04W 72/569; H04W 72/02; H04W 72/0446; H04L 5/16; H04L 51/226; H04L 67/60; H04L 41/046; Y02D 30/70
See application file for complete search history.

(56) References Cited

U.S. PATENT DOCUMENTS 4,516,239 A * 5/1985 Maxemchuk ........ H04M 11/068
370/445
4,987,571 A * 1/1991 Haymond ......... H04W 74/0808
370/445
(Continued)

FOREIGN PATENT DOCUMENTS

CN          1232358 A      10/1999
CN          1728847 A      2/2006
(Continued)

OTHER PUBLICATIONS

International Search Report for corresponding application PCT/ CN2021/129611 filed Nov. 9, 2021; Mail date Jan. 28, 2022.
(Continued)

*Primary Examiner* — Afshawn M Towfighi
(74) *Attorney, Agent, or Firm* — CANTOR COLBURN LLP

(57) ABSTRACT

The embodiments provide a message transmission method, a terminal, and a storage medium. In a message transmission method performed by a first terminal, a half-duplex communication mode is used between the first terminal and a second terminal, and the method includes: acquiring a message type of a message to be transmitted, wherein the message type comprises: a timely type and a temporary type; in response to determining that the message to be transmitted is a message of the timely type, allocating a corresponding transmission protect period for the message of the timely type, and preferentially transmitting the message of the timely type to the second terminal within the transmission protect period, so that the second terminal executes an operation corresponding to the message of the timely type, wherein the transmission protect period is used for transmitting the message of the timely type.

19 Claims, 6 Drawing Sheets

101

Acquire a transmission priority level of a message to be transmitted

102

In response to determining that the message to be transmitted is a message of a high priority level, acquire a preset transmission protect period, and preferentially transmit the message to be transmitted to a second terminal within the transmission protect period, so that the second terminal executes an operation corresponding to the message to be transmitted

(56) References Cited

U.S. PATENT DOCUMENTS

| | | | |
|---|---|---|---|
| 5,058,110 A * | 10/1991 | Beach | G06F 13/128 |
| | | | 370/464 |
| 7,761,108 B2 | 7/2010 | Lim | |
| 2004/0196850 A1 | 10/2004 | Ho | |
| 2005/0058070 A1 | 3/2005 | Burghardt | |
| 2008/0002735 A1 | 1/2008 | Poirier et al. | |
| 2015/0280894 A1 | 10/2015 | Charbit | |
| 2016/0103911 A1 * | 4/2016 | Logue | H04L 61/4541 |
| | | | 707/695 |
| 2018/0115960 A1 * | 4/2018 | Sorrentino | H04W 72/23 |
| 2019/0373631 A1 * | 12/2019 | Gulati | H04W 74/0816 |
| 2020/0077421 A1 * | 3/2020 | Asterjadhi | H04L 5/006 |

FOREIGN PATENT DOCUMENTS

| | | |
|---|---|---|
| CN | 1922827 A | 2/2007 |
| CN | 104125098 A | 10/2014 |
| CN | 10599218 A | 10/2016 |
| CN | 106797644 A | 5/2017 |
| CN | 109561491 A | 4/2019 |
| CN | 109729550 A | 5/2019 |
| CN | 111356240 A | 6/2020 |
| CN | 112042215 A | 12/2020 |
| CN | 113572629 A | 10/2021 |
| JP | H11266484 A | 9/1999 |
| JP | 2003208398 A | 7/2003 |
| JP | 2008227778 A | 9/2008 |
| JP | 2009060660 A | 3/2009 |
| JP | 2012195639 A | 10/2012 |
| JP | 2016021020 A | 2/2016 |
| KR | 20090012593 A | 2/2009 |
| WO | 03017577 A1 | 2/2003 |
| WO | 2005081463 A1 | 9/2005 |
| WO | 2007048478 A1 | 5/2007 |
| WO | 2019241321 A1 | 12/2019 |

OTHER PUBLICATIONS

European Search Report for corresponding application EP21905377 dated Feb. 29, 2024.

Korean Office Action; Application No. 10-2023-7024210; Filing Date: Jul. 14, 2023; date of mailing: Oct. 3, 2025; 13 pages.

Chinese Office Action for corresponding application 202011480289.3; Mail date Feb. 21, 2022.

Japanese Office Action for corresponding application 2023536121; dated Jul. 28, 2025.

Chinese Search Report for corresponding application 202011480289.3; Mail date Jul. 19, 2022.

Japanese Patent Application Laid-Open No. 227778 / 2008 Toshiya Matsui, Communication Technology Spreading with IEEE1394 from Personal Computer Peripheral Devices to Interfaces of Information Appliances, Transistor Technology Special No. 70, Japan, CQ Publishing Co., Ltd.

* cited by examiner

Fig. 1

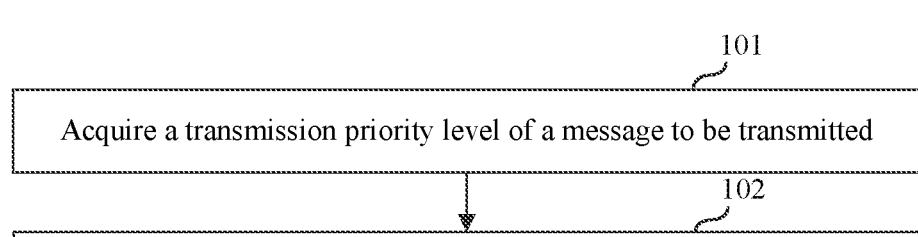

101

Acquire a transmission priority level of a message to be transmitted

102

In response to determining that the message to be transmitted is a message of a high priority level, acquire a preset transmission protect period, and preferentially transmit the message to be transmitted to a second terminal within the transmission protect period, so that the second terminal executes an operation corresponding to the message to be transmitted

Fig. 2

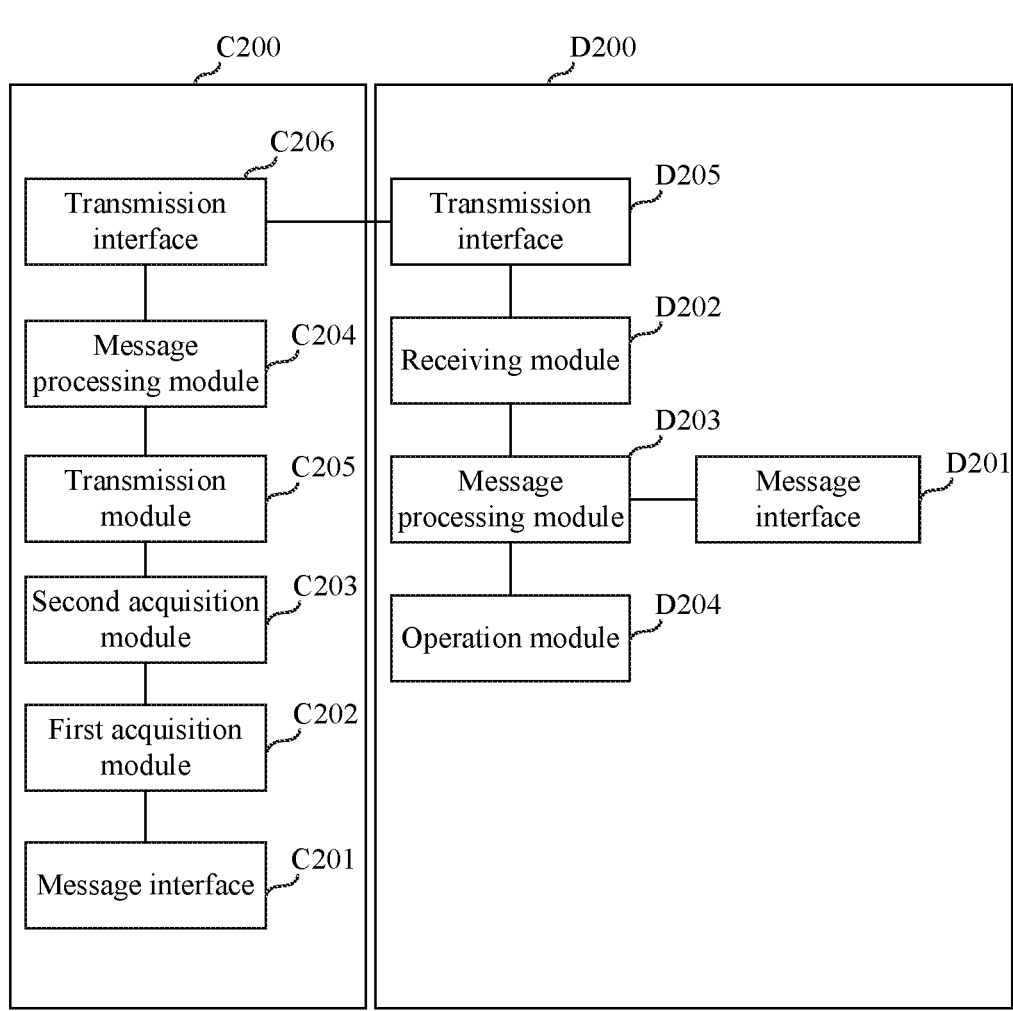

C200                    D200

C206

Transmission interface

D205

Transmission interface

Message processing module    C204

D202

Receiving module

Transmission module    C205

D203

Message processing module

Message interface    D201

Second acquisition module    C203

Operation module    D204

First acquisition module    C202

Message interface    C201

| SOF (a byte) | Msg (b byte) | EOF (c byte) |
| --- | --- | --- |

| SOF (a byte) | Scramble SEQ (b byte) | Msg Type (c byte) | Msg (1~n byte) | CRC (d byte) | EOF (e byte) |
| --- | --- | --- | --- | --- | --- |

Figures 8, 9:
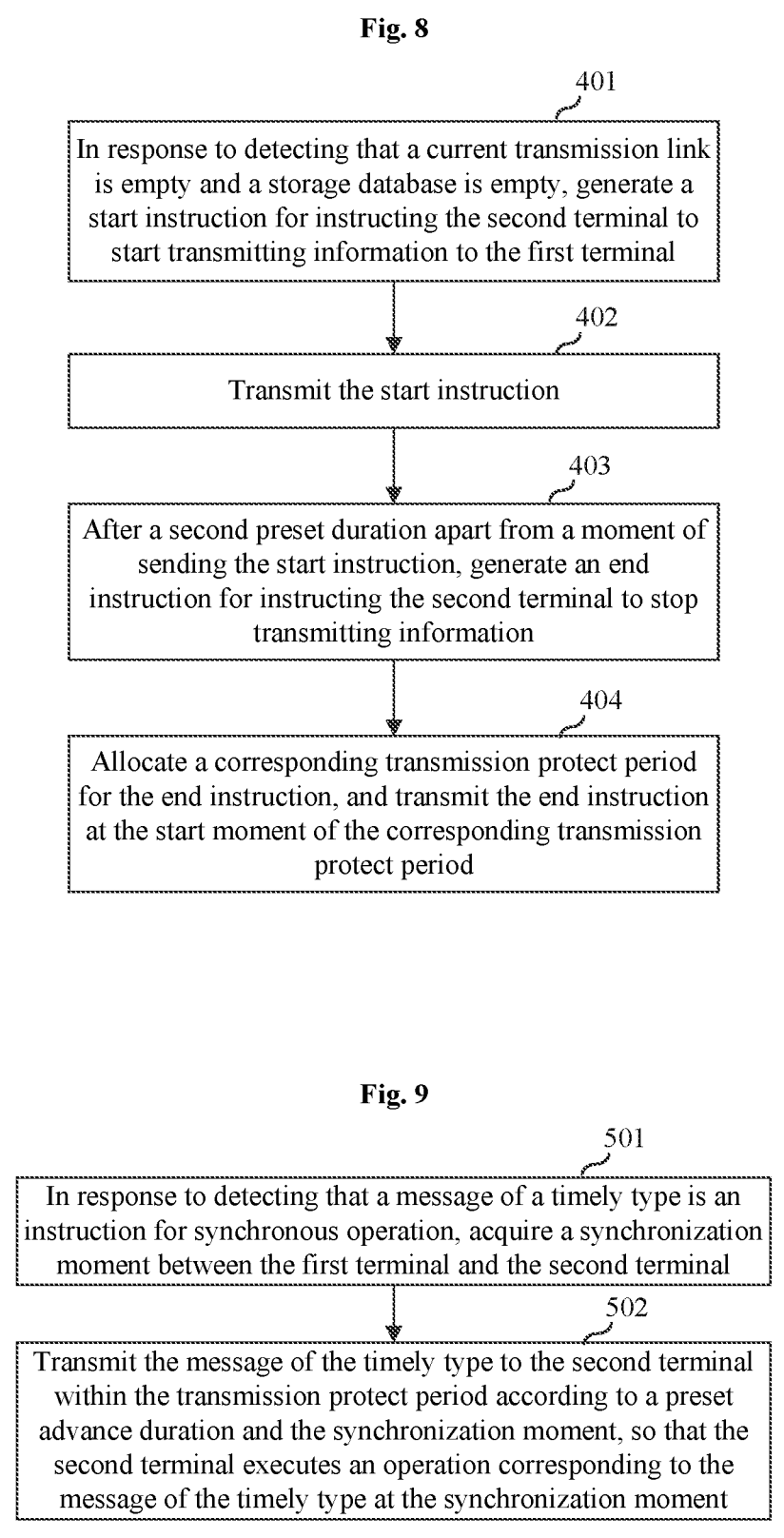

In response to detecting that a current transmission link is empty and a storage database is empty, generate a start instruction for instructing the second terminal to start transmitting information to the first terminal

402

Transmit the start instruction

403

After a second preset duration apart from a moment of sending the start instruction, generate an end instruction for instructing the second terminal to stop transmitting information

404

Allocate a corresponding transmission protect period for the end instruction, and transmit the end instruction at the start moment of the corresponding transmission protect period

In response to detecting that a message of a timely type is an instruction for synchronous operation, acquire a synchronization moment between the first terminal and the second terminal

502

Transmit the message of the timely type to the second terminal within the transmission protect period according to a preset advance duration and the synchronization moment, so that the second terminal executes an operation corresponding to the message of the timely type at the synchronization moment

HALF-DUPLEX PERIODIC MESSAGE TRANSMISSION METHOD, TERMINAL AND STORAGE MEDIUM

CROSS-REFERENCE TO RELATED APPLICATION

The present disclosure is a National Stage Filing of the PCT International Application No. PCT/CN2021/129611 filed on Nov. 9, 2021, which is based on and claims priority to Chinese Patent Application No. 202011480289.3 and filed on Dec. 15, 2020, the disclosure of which is incorporated herein by reference in its entirety.

TECHNICAL FIELD

Embodiments of the present disclosure relate to the field of communications, and in particular, to a message transmission method, a terminal, and a storage medium.

BACKGROUND

In current end-to-end communications, according to time division situations, the communications may be divided into a simplex mode, a full-duplex mode and a half-duplex mode. The half-duplex mode has a low transmission efficiency, but can save transmission line, and therefore the half-duplex transmission mode is still widely applied, for example, in scenarios which do not require high transmission rate and high timeliness of message reception.

Half-duplex communication means that both communication parties are able to send information, but cannot send information at the same time or receive information at the same time. In the half-duplex communication mode, at the same moment, only one party can send information and the other party receives information, which renders that message transmission of both communication parties is not timely. However, in some half-duplex communication scenarios, there are still a small amount of messages which have high requirements on timeliness and accuracy, and when the half-duplex communication mode is used, both communication parties cannot receive and send messages in time, which affects the operation of devices. For example, a power amplifier control command in communication between a terminal/base station and an antenna device has high requirements on timeliness and accuracy, however, when a half-duplex communication mode is used between the terminal/base station and the antenna device, only one transmission line can be used to send messages, and thus the message transmission speed is low, which renders that the terminal cannot accurately and timely control the power on/off of a power amplifier module of the antenna device, affecting the operation of the antenna device.

SUMMARY

Embodiments of the present disclosure provide a message transmission method performed by a first terminal, wherein a half-duplex communication mode is used between the first terminal and a second terminal. The method includes: a message type of a message to be transmitted is acquired, wherein the message type includes: a timely type and a temporary type; and in response to determining that the message to be transmitted is a message of the timely type, a corresponding transmission protect period is allocated for the message of the timely type, and the message of the timely type is preferentially transmitted to the second terminal within the transmission protect period, so that the second terminal executes an operation corresponding to the message of the timely type, wherein the transmission protect period is used for transmitting the message of the timely type.

Embodiments of the present disclosure further provide a terminal, including: at least one processor, and a memory in communication connection with the at least one processor; wherein the memory stores instructions executable by the at least one processor, and the instructions, when being executed by the at least one processor, cause the at least one processor to execute the message transmission method.

Embodiments of the present disclosure further provide a computer-readable storage medium, storing a computer program, wherein the computer program, when being executed by a processor, causes the processor to execute the message transmission method.

BRIEF DESCRIPTION OF THE DRAWINGS

FIG. 1 is a flowchart of a message transmission method provided according to a first embodiment of the present disclosure;

FIG. 2 is a schematic diagram of connection between a first terminal and a second terminal provided according to a second embodiment of the present disclosure;

FIG. 8 is a flowchart of a message transmission method provided according to a fourth embodiment of the present disclosure;

FIG. 9 is an implementation schematic diagram of transmitting a high-priority-level message in a message transmission method provided according to a fifth embodiment of the present disclosure;

US 12,588,054 B2

3

Figure 13:
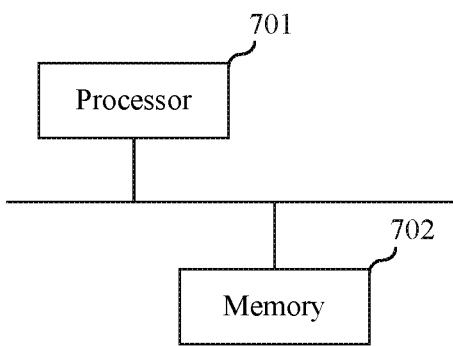

FIG. 13 is a structural block diagram of a terminal provided according to a seventh embodiment of the present disclosure.

DETAILED DESCRIPTION

The embodiments of the present disclosure propose a message transmission method, a terminal and a storage medium, which may ensure the timeliness and accuracy of message transmission between terminals.

To make the objects, technical solutions, and advantages of the embodiments of the present disclosure clearer, hereinafter, the embodiments of the present disclosure will be described in detail in combination with the accompanying drawings. However, a person having ordinary skill in the art may understand that in the embodiments of the present disclosure, many technical details are provided to enable readers to better understand some embodiments of the present disclosure. However, even without these technical details, based on various changes and modifications of the following embodiments, the technical solutions of some embodiments of the present disclosure may also be achieved. Division of the following embodiments is for convenience of description, and shall not constitute any limitation to exemplary implementations of the present disclosure. The embodiments may be referred to each other and combined with each other without any contradiction.

A first embodiment of the present disclosure relates to a message transmission method performed by a first terminal. A half-duplex communication mode is used between the first terminal and a second terminal. The flow of the message transmission method is as shown in FIG. 1 and includes the following operations 101 and 102.

At 101, a message type of a message to be transmitted is acquired, wherein the message type includes: a timely type and a temporary type; and At 102, in response to determining that the message to be transmitted is a message of the timely type, a corresponding transmission protect period is allocated for the message of the timely type, and the message of the timely type is preferentially transmitted to the second terminal within the transmission protect period, so that the second terminal executes an operation corresponding to the message of the timely type, wherein the transmission protect period is used for transmitting the message of the timely type.

In the message transmission method in the present disclosure, a message type of a message to be transmitted is acquired, wherein the message type includes: a timely type and a temporary type; in response to determining that the message to be transmitted is a message of the timely type, a corresponding transmission protect period is allocated for the message of the timely type, and the message of the timely type is preferentially transmitted to the second terminal within the corresponding transmission protect period. As the message of the timely type has the corresponding transmission protect period, the message of the timely type exclusively occupies the transmission protect period, ensuring timely transmission of the message of the timely type to the second terminal, so that the second terminal may execute an operation corresponding to the message of the timely type in time, thereby realizing accurate control of the first terminal on the second terminal. Moreover, a half-duplex communication mode is used between the first terminal and the second terminal, that is, there is only one communication link between the first terminal and the second terminal, thereby saving communication links. In the half-duplex communication mode, the timeliness and accuracy of transmission of the message of the timely type are ensured, and application scenarios of the half-duplex communication mode are increased.

A second embodiment of the present disclosure relates to a message transmission method, and the second embodiment provides exemplary description for operations 101 and 102 in the first embodiment.

For ease of understanding, a first terminal and a second terminal are introduced in this example. The message transmission method may be applied to the first terminal, wherein the first terminal may be a base station device, or a terminal device such as an aviation device. The second terminal may be a base station device, or a communication device such as an antenna device. In this example, the first terminal and the second terminal are in a master-slave relationship, that is, the first terminal device is a master device, the second terminal device is a slave device, and the master device is used for controlling the slave device. The half-duplex communication mode is used between the first terminal and the second terminal. In the half-duplex communication mode, the first terminal may send a message to the second terminal, and the second terminal may send a message to the first terminal.

A schematic structural diagram of the first terminal C200 and the second terminal D200 is as shown in FIG. 2. The first terminal may include: a message interface C201, a first acquisition module C202, a second acquisition module C203, a message processing module C204, a transmission module C205, and a transmission interface C206. The message interface C201 and the transmission interface C206 are physical interfaces. The message interface C201 is used to exchange information with a software high layer, and the message interface C201 may include: a network port, an SPI, a Serdes, etc. It can be understood that information exchange between software high layers of the first terminal may be implemented via different interface protocols. The transmission interface C206 may use devices in different time division forms, and is configured to modulate and demodulate a digital signal, and the transmission interface C206 may use media such as a coaxial cable, an optical fiber, and a twisted pair, etc. The first acquisition module C202, the second acquisition module C203, the message processing module C204 and the transmission module C205 are logical modules in the present example. The first acquisition module C202 is configured to acquire a transmission priority level of a message to be transmitted. The second acquisition module C203 is configured to acquire a transmission protect period allocated for a message of the timely type, wherein the transmission protect period is used for transmitting the message of the timely type. The message processing module C204 may be configured to encode or decode the message to be transmitted. The transmission module C205 is configured to transmit, in response to determining that the message to be transmitted is a message of the timely type, the message of the timely type to the second terminal within the transmission protect period corresponding to the message of the timely type, so that the second terminal executes an operation corresponding to the message of the timely type.

By the same reasoning, the second terminal may also adopt a structure similar to that of the first terminal. As shown in FIG. 2, the second terminal includes: a message interface D201, a receiving module D202, a message processing module D203, an operation module D204 and a transmission interface D205. The transmission interface C206 of the first terminal is connected to the transmission interface D205 of the second terminal. The message interface D201 is configured to exchange information with a software upper layer. The receiving module D202 is configured to receive the message of the timely type sent by the first terminal within the transmission protect period, wherein the transmission protect period is used for the message of the timely type of the first terminal. The message processing module D203 is configured to decode or encode a message. The operation module D204 is configured to execute an operation corresponding to the message of the timely type. The first terminal and the second terminal are connected in the manner as shown in FIG. 2, and it can be understood that the first terminal and the second terminal may further include other modules, which are not listed one by one herein.

In this example, by taking the first terminal being an aviation device and the second terminal being an antenna device as an example, the aviation device and the antenna device are networked. A message interface of the aviation device is a 10G network port, and both unpacking and format conversion of messages are completed at a software layer. A coaxial cable is used for signal transmission between an aviation terminal device and an antenna device, and a transmission protocol of a digital signal uses a serial port protocol, and after modulated by binary amplitude keying (OOK: On-Off Keying), the digital signal is converted into an analogue amplitude-modulated signal for transmission.

Figures 3, 4, 5:
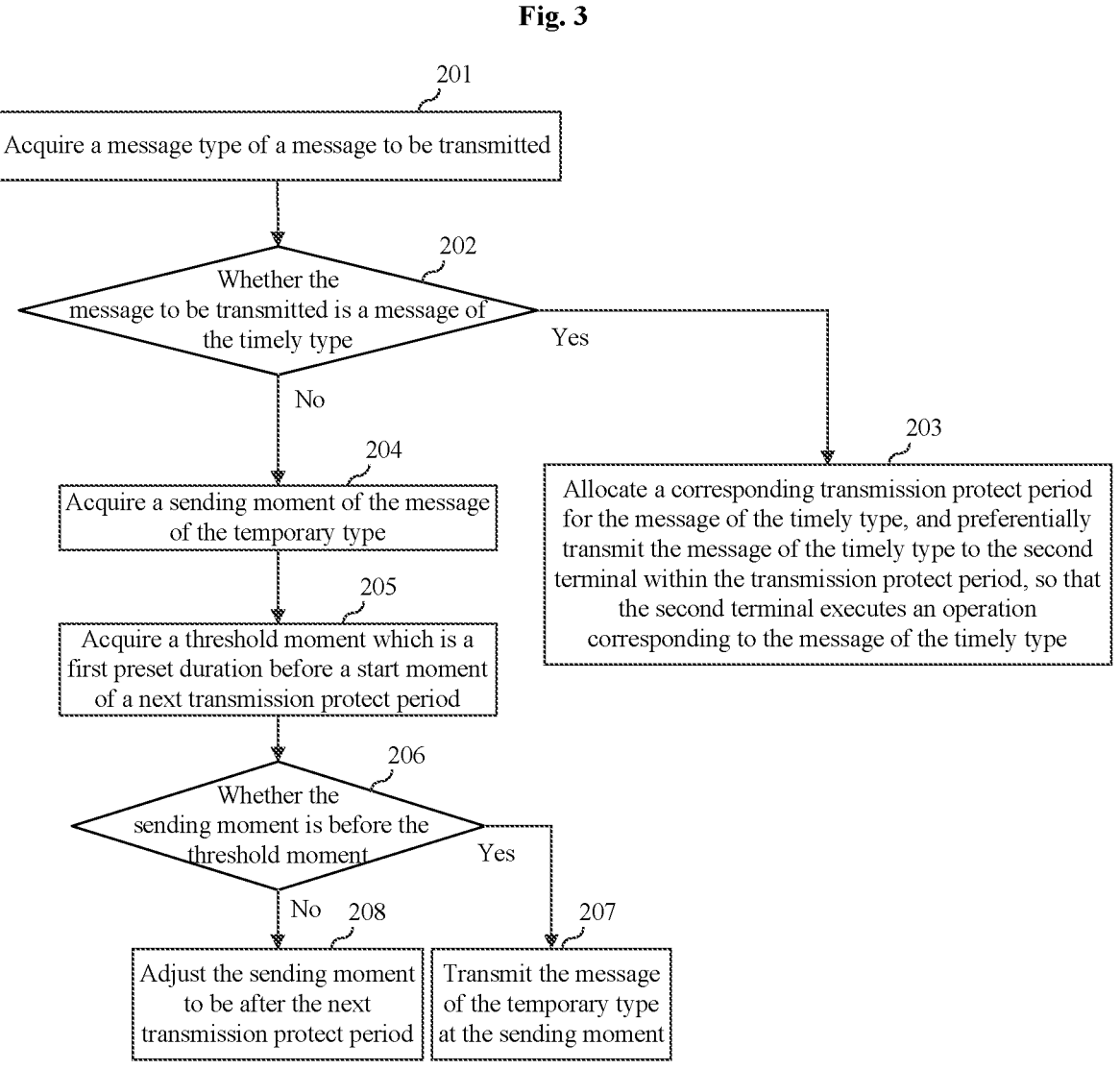
FIG. 3 is a flowchart of a message transmission method provided according to the second embodiment of the present disclosure.
FIG. 4 is a schematic diagram of a frame structure of a high-priority-level message in the message transmission method provided according to the second embodiment of the present disclosure.
FIG. 5 is a schematic diagram of a frame structure of a low-priority-level message in the message transmission method provided according to the second embodiment of the present disclosure.

The flow of the message transmission method in this embodiment is as shown in FIG. 3:

At 201, a message type of a message to be transmitted is acquired, wherein the message type includes: a timely type and a temporary type.

In some exemplary implementations, the transmission type of the message to be transmitted may be preset. The message of the timely type is a message with relatively high requirements on real-time performance and accuracy, and may be a periodic message that may be non-disposable. For example, the message of the timely type may include: an instruction for controlling a power amplifier of the antenna device, a start instruction for instructing the antenna device to start sending information to the first terminal, and an end instruction for instructing the antenna device to stop sending information to the first terminal. The message of the temporary type may be a non-periodic message, such as a handshake request, etc. The message of the temporary type may include: antenna state querying, port operation state querying, port operation mode querying, entering/exiting a line loss test mode, line loss test message, line loss test result message, antenna software/hardware version querying, antenna SN number querying, antenna port beam setting command, antenna temperature querying, firmware upgrade starting/continuing/end command, firmware upgrade version CRC check result querying command, a command instructing to enter a receiving/sending test mode, a command instructing to enter a receiving/sending diagnostic mode, antenna manufacturer querying, etc.

In an example, a frame structure of the message of the timely type includes: a message header, message content and a message trailer; and a frame structure of the message of the temporary type includes: a message header, a scramble sequence, a message type, message content, a check value and a message trailer.

In some exemplary implementations, the frame structure of the message of the timely type may be set to include a message header, message content and a message trailer. The frame structure is as shown in FIG. 4, for example, the frame structure of the message of the timely type includes a message header of a length of a Byte, message content of a length of b Byte and a message trailer of a length of c Byte.

The length of the message content in the message of the timely type is usually short, so that it may be ensured that the message content does not have content overlapping with the message header or the message trailer, thereby ensuring that the message content may be completely identified.

The frame structure of the message of the temporary type is as shown in FIG. 5, including, for example, a message header of a Byte, a scramble sequence of b Byte, a message type of c byte, message content of a length of 1~n Bytes, a CRC check value of d byte, and a message trailer of e Byte. The message content in the message of the temporary type is long, so the scramble sequence is provided to avoid the occurrence of the same field in flag bits of the message content and the message header. By the same reasoning, the CRC check value is provided to avoid the occurrence of the same field in flag bits of the message trailer and the message content.

In the present embodiment, a primitive polynomial may be selected to perform scrambling processing on the message, for example, in the present embodiment, the primitive polynomial may be $m(x)=(x^8+x^4+x^3+x+1)$ to perform scrambling processing on the message, where $m(x)$ represents the scramble sequence. The scrambled code stream is encoded according to an HDLC protocol.

At 202, whether the message to be transmitted is a message of the timely type is determined; in response to determining that the message to be transmitted is a message of the timely type, operation 203 is executed; and in response to determining that the message to be transmitted is a message of the temporary type, operation 204 is executed.

In some exemplary implementations, there are multiple methods for determining whether the message to be transmitted is a message of the timely type. For example, three determination manners therein will be listed below.

Manner I: A Transmission Type Indicated by a Software High Layer is Acquired.

The message to be transmitted is sent by the software high layer, and when sending the message to be transmitted, the software high layer correspondingly indicates a transmission type of the message to be transmitted, for example, the software high layer sends a message to be transmitted A, and correspondingly indicates a transmission type of the message to be transmitted A as a timely type.

Manner II: A Transmission Type is Determined According to a Message Header of the Message to be Transmitted.

In some exemplary implementations, a transmission type may be marked in the message header of the message to be transmitted, and the transmission type of the message to be transmitted is determined by identifying the message header.

Manner III: A Transmission Type is Identified According to a Frame Structure of the Message to be Transmitted.

In some exemplary implementations, a message of the timely type includes a message header, message content and a message trailer; and a message of the temporary type includes: a message header, a scramble sequence, a message type, message content, a check value and a message trailer. Therefore, in a case where the frame structure of the message to be transmitted is identified to include three parts, it is determined that the message to be transmitted is a message of the timely type; and in a case where the frame structure of the message to be transmitted is identified to include six parts, it is determined that the message to be transmitted is a message of the temporary type.

It should be noted that in addition to the above three determination manners, other determination manners may also be used. For example, a periodic message is taken as a message of the timely type, and in response to identifying that the message to be transmitted is a periodic message, then it is determined that the message to be transmitted is a message of the timely type.

In response to determining that the message to be transmitted is a message of the timely type, operation 203 is executed; and in response to determining that the message to be transmitted is a message of the temporary type, operation 204 is executed.

At 203, a corresponding transmission protect period is allocated for the message of the timely type, and the message of the timely type is preferentially transmitted to the second terminal within the transmission protect period, so that the second terminal executes an operation corresponding to the message of the timely type, wherein the transmission protect period is used for transmitting the message of the timely type.

In some exemplary implementations, a corresponding transmission protect period may be allocated in each transmission cycle of a periodic message; alternatively, transmission protect periods may also be allocated at an interval of a preset number of transmission cycles. The cycle of the transmission protect period may be allocated according to actual needs. For example, in a case where the message of the timely type includes a periodic message, then the transmission protect period may be allocated according to the periodicity of the message of the timely type. The transmission protect period is used for transmitting the message of the timely type, that is, the transmission protect period is exclusively occupied to transmit (i.e., dedicated for transmitting) the message(s) of the timely type.

The time length of the transmission protect period may be determined according to a message length and the number of the messages of the timely type, so that the length W of the transmission protect period is greater than the total sending time of the to-be-sent messages of the timely type, so as to ensure that the messages of the timely type may be completely transmitted within the transmission protect period.

After a corresponding transmission protect period is allocated for the message of the timely type, upon detection a start moment of the transmission protect period, the message of the timely type is preferentially transmitted (i.e., first transmitted) to the second terminal within the transmission protect period, and the second terminal receives the message of the timely type and then executes a corresponding operation. Hereinafter, an example is provided for illustration.

Figure 6:
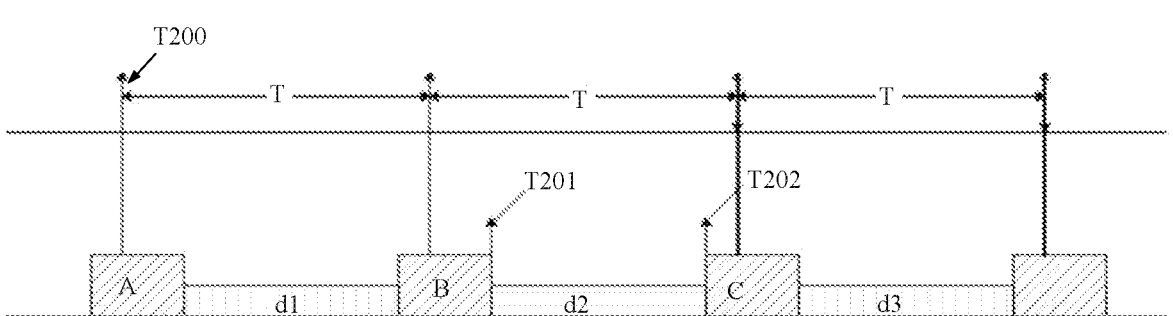
FIG. 6 is a schematic diagram of a sequence diagram of transmitting a message in the message transmission method provided according to the second embodiment of the present disclosure.

For example, the message to be transmitted is a power-on instruction for power amplifier control, and as shown in the sequence diagram of transmission of messages in FIG. 6, a transmission cycle is T, and three transmission cycles are shown in FIG. 6; and each transmission cycle is correspondingly allocated with a transmission protect period (for example, the block A having oblique lines in FIG. 4). In a first transmission cycle, the length of the transmission protect period is W, and when a moment T200 is detected, the power-on instruction for power amplifier control is transmitted in the transmission protect period A, and after the second terminal receives the power-on instruction for power amplifier control, a power amplifier power-on operation is performed.

At 204, a sending moment of the message of the temporary type is acquired, wherein the sending moment is within a period between a current transmission protect period and a next transmission protect period.

In some exemplary implementations, in a case where the message is a message of the temporary type, the sending moment of the message of the temporary type may be set in a period between the current transmission protect period and the next transmission protect period. For example, in a case where the period between the current transmission protect period and the next transmission protect period is T1 to T3, then a moment may be selected within the range between T1 and T3 as the sending moment of the message of the temporary type.

At 205, a threshold moment which is a first preset duration before a start moment of a next transmission protect period is acquired.

In some exemplary implementations, the start moment of the next transmission protect period is acquired, and a moment which is a first preset duration before the start moment is determined as the threshold moment. The first preset duration may be set according to actual applications, for example, the first preset duration may be a maximum duration of transmission of the message of the temporary type, for example, the first preset duration may be equal to 120 ms.

In another example, a transmission duration of the message of the temporary type is acquired; and a duration greater than or equal to the transmission duration is determined as the first preset duration.

In some exemplary implementations, a transmission duration of the message of the temporary type may be acquired, and a duration greater than or equal to the transmission duration may be acquired as the first preset duration. For example, in a case where the transmission duration of the message of the temporary type is 60 ms, then a duration greater than or equal to 60 ms may be selected as the first preset duration, for example, the first preset duration may be equal to 60 ms, 70 ms, and the like.

At 206, whether the sending moment is before the threshold moment is determined, in response to determining that the sending moment is before the threshold moment, operation 207 is executed; and otherwise, operation 208 is executed.

In a case where the sending moment is earlier than the threshold moment, it indicates that if transmission of the message of the temporary type starts from the sending moment, the transmission of the message of the temporary type can be completed before the next transmission protect period; and therefore, operation 207 may be executed. In a case where the sending moment is later than the threshold moment, it is determined that transmission of the message of the temporary type cannot be completed before the start of the next transmission protect period, and in such a case, the sending moment of the message of the temporary type is adjusted, so as to avoid incomplete transmission of the message of the temporary type caused by interruption from the transmission protect period, or avoid the problem of re-transmission of the message of the temporary type.

At 207, the message of the temporary type is transmitted at the sending moment.

At 208, the sending moment is adjusted to be after the next transmission protect period.

In some exemplary implementations, the sending moment is adjusted, and since the message of the temporary type cannot be sent completely before the start of the next transmission protect period, the sending moment may be adjusted to a moment in a period after the next transmission protect period. For example, as shown in FIG. 6, the sending moment of the message of the temporary type is t0 and is located in the d1 period between the transmission protect period A and the transmission protect period B, and in a case where t0 is later than the threshold time td, then the sending moment of the message of the temporary type is adjusted to a moment in the period after the transmission protect period B, for example, adjusted to a moment in the d2 period between the transmission protect period B and the transmission protect period C, and may also be adjusted to a moment in the d3 period.

In the present embodiment, in response to determining that the message to be transmitted is a message of the temporary type, the sending moment is detected, thereby ensuring the integrity of transmission of the message of the temporary type, avoiding the situation of transmission failure of the message of the temporary type caused by interruption from a next transmission protect period before the transmission of the message of the temporary type is completed. Moreover, in a case where a transmission link supports retransmission, the situation in which the transmission link retransmits the message of the temporary type may also be avoided, reducing unnecessary loss of the link, and increasing the transmission efficiency of the transmission link.

Figure 7:
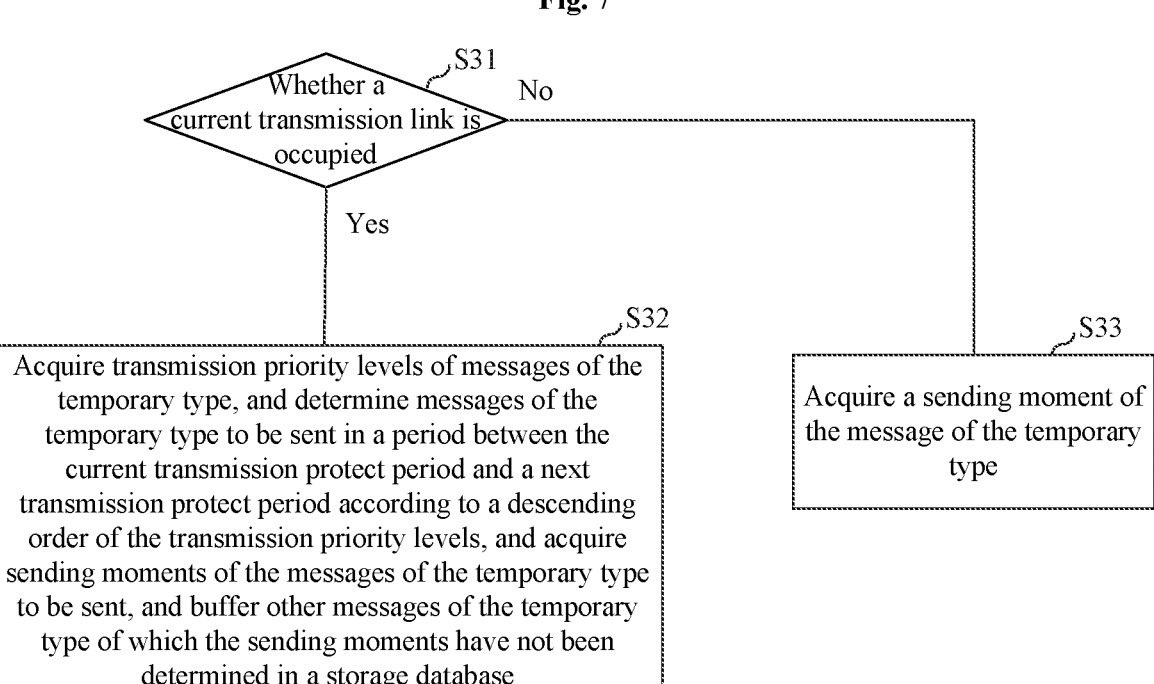
FIG. 7 is an implementation schematic diagram of acquiring a sending moment of a message of the temporary type in a message transmission method provided according to a third embodiment of the present disclosure.

A third embodiment of the present disclosure relates to a message transmission method. The present embodiment provides a detailed introduction concerning acquisition of a sending moment of the message of the temporary type in the second embodiment. A flow of acquiring a sending moment of the message of the temporary type is as shown in FIG. 7.

At S31, whether a current transmission link is occupied is determined, in response to detecting that the current transmission link is occupied, operation S32 is executed, and in response to detecting that the current transmission link is empty and a storage database is empty, operation S33 is executed.

At S32, in response to detecting that the current transmission link is occupied, transmission priority levels of messages of the temporary type are acquired, and messages of the temporary type to be sent in a period between the current transmission protect period and a next transmission protect period are determined according to a descending order of the transmission priority levels, and sending moments of the messages of the temporary type to be sent are acquired, and other messages of the temporary type of which the sending moments have not been determined are buffered in the storage database.

In some exemplary implementations, each message of the temporary type has a corresponding transmission priority level. In a case where a message received is a message of the temporary type and the current transmission link is occupied, then the transmission priority level of the message of the temporary type may be acquired.

Currently received messages or buffered messages of the temporary type may be transmitted to the second terminal in a period between two adjacent transmission protect periods according to a descending order of the transmission priority levels.

Whether the transmission priority level is the highest priority level is determined, and in a case where the transmission priority level is the highest priority level, the message of the temporary type with the highest priority level is preferentially transmitted (i.e., first transmitted) in a period outside the transmission protect period. In a case where the priority level of the message of the temporary type is higher than the priority level of a message currently being sent, as the priority level of the message of the temporary type is higher than the priority level of the message currently being sent, the message of the temporary type may be preferentially transmitted (i.e., first transmitted) within a period outside the transmission protect period, and therefore it may be determined that the current sending moment of the message of the temporary type is within the period outside the current transmission protect period. In a case where the priority level of the message of the temporary type is the same as the priority level of the message occupying the transmission link, the currently received message of the temporary type may be buffered. In a case where the priority level of the currently received message of the temporary type is lower than the priority level of the message occupying the transmission link, the message of the temporary type may be buffered.

It should be noted that the storage database may perform buffering according to a descending order of priority levels of messages, so that messages of the temporary type with high priority levels may be retrieved first. The storage database may also directly buffer the message of the temporary type.

Messages are acquired from the storage database according to a descending order of transmission priority levels, i.e. messages of the temporary type with high priority levels are acquired first, and then messages of the temporary type with low priority levels are acquired, thereby further ensuring timely transmission of messages of the temporary type with high priority levels.

At S33, in response to detecting that the current transmission link is empty and the storage database is empty, a sending moment of the message of the temporary type is acquired.

In response to detecting that the current transmission link is empty and the storage database is empty, in a case where a message of the temporary type is received, since no other message of the temporary type is stored or occupies the transmission link, the sending moment of the message of the temporary type may be directly determined within a period between the current transmission protect period and a next transmission protect period.

In some exemplary implementations, as shown in FIG. 6, the transmission protect period A is used to transmit message (s) of the timely type, and the period d1 between the transmission protect period A and the transmission protect period B may be used to transmit message(s) of the temporary type.

It can be understood that when a message of the temporary type with a low priority level is transmitted in a period between adjacent transmission protect periods, in a case where a message of the temporary type with a high priority level is received, the transmission of a message of the temporary type with a low priority level will be stopped, and the received message with a high priority level is transmitted in the period between the adjacent transmission protect periods; and after transmission of the message of the temporary type with a high priority level is completed, the message of the temporary type with a low priority level is transmitted in the period between the adjacent transmission protect periods.

In the embodiments of the present disclosure, a corresponding transmission protect period is allocated for a message of the timely type, so that the message of the timely type exclusively occupies the transmission protect period, thereby ensuring that the second terminal may timely receive a message of the timely type with high requirements for timeliness and accuracy. In addition, a message of the temporary type is transmitted in a period outside the transmission protect period, since the message of the temporary type has low requirements for timeliness and accuracy, and does not need to be transmitted in real time. Messages of the temporary type are transmitted in a period outside the transmission protect period according to a descending order indicated by transmission priority levels, ensuring timely transmission of messages of the temporary type with high priority levels, and increasing the transmission efficiency of a half-duplex communication mode.

A fourth embodiment of the present disclosure relates to a message transmission method. The present embodiment further improves the described embodiments, and the main improvement lies in that: in this fourth embodiment, in a case where it is detected that a transmission link is empty and a storage database is empty, a start instruction is generated, so that the second terminal may transmit a message to the first terminal. A flow thereof is as shown in FIG. 8.

At 401, in response to detecting that a current transmission link is empty and a storage database is empty, a start instruction for instructing the second terminal to start transmitting information to the first terminal is generated, wherein the storage database is used for buffering messages of the temporary type.

In some exemplary implementations, in a case where a link to be transmitted is empty and it is detected that the storage database is empty, it indicates that currently, the first terminal have no message to be transmitted, and the first terminal may control the second terminal to transmit information. The first terminal generates the start instruction, wherein the start instruction is used to instruct the second terminal to start transmitting information to the first terminal, and the type of the start instruction is the timely type.

At 402, the start instruction is transmitted

In some exemplary implementations, a corresponding transmission protect period may be allocated to the start instruction, and the start instruction starts to be transmitted at a moment which is a third duration before an end moment of the corresponding transmission protect period. The end moment of the transmission protect period and a transmission duration of the start instruction are acquired, and a start moment of the start instruction is determined according to the end time of the transmission protect period and the transmission duration of the start instruction, so that the transmission of the start instruction is completed at the end of the transmission protect period. For example, in a case where the transmission duration of the start instruction is a; and the end time of the transmission protect period is tb; then the moment at which the start instruction is transmitted is tb-a.

As the start instruction is transmitted at a moment which is a second preset duration before the end moment of the transmission protect period (the second preset duration may be the transmission duration of the start instruction), it may be ensured that the transmission of the start instruction in the transmission protect period will not occupy too much duration in the transmission protect period.

In another example, since there are no other messages to be transmitted at this time, the start instruction may also be directly transmitted during the period between adjacent transmission protect periods.

At 403, after a second preset duration apart from a moment of sending the start instruction, an end instruction for instructing the second terminal to stop transmitting information is generated.

In some exemplary implementations, the second preset duration may be set according to actual applications. For example, the second preset duration may be a duration in which the first terminal receives information transmitted by the second terminal, and may alternatively be set to a maximum duration apart from the start of a next transmission protect period. The end instruction instructs the second terminal to stop transmitting information.

At 404, a corresponding transmission protect period is allocated for the end instruction, and the end instruction is transmitted at the start moment of the corresponding transmission protect period.

The operation of allocating the corresponding transmission protect period for the end instruction is substantially the same as operation 202 in the second embodiment, and will not be repeated herein.

The end instruction is transmitted at the start of the transmission protect period, so that in a case where other messages of the timely type are received, the remaining period in the transmission protect period may be allocated to other messages of the timely type, thereby reducing the effect of the end instruction on transmission of other messages of the timely type.

It should be noted that the first terminal sends the start instruction to the second terminal, and the second terminal transmits feedback information to the first terminal within a period between two transmission protect periods. The second terminal may transmit the feedback information by occupying the period between two adjacent transmission protect periods, for example, the d1 period as shown in FIG. 6 may be used for transmitting the feedback information. The feedback information may include: state information of the second terminal, etc.; for example, when the second terminal is an antenna device, the feedback information may include antenna device state information, such as information of temperature and antenna angle, etc. In a case where the first terminal receives the feedback information transmitted by the second terminal last time, the first terminal may generate an end instruction used for instructing the second terminal to stop transmitting information, and transmits the end instruction to the second terminal. After receiving the end instruction, the second terminal stops sending information to the first terminal.

According to the message transmission method in the present embodiment, after the first terminal have no message to be transmitted, the first terminal controls, by transmitting the start instruction, the second terminal to transmit information to the first terminal; and after receiving the information transmitted by the second terminal, the first terminal controls, by transmitting an end instruction, the second terminal to end information transmission, and thus the information transmission of the second terminal is controlled by the first terminal, such that in the half-duplex communication mode, the message sending of the second terminal is controlled by the first terminal, ensuring that message sending of the second terminal does not affect message sending of the first terminal.

A fifth embodiment of the present disclosure relates to a message transmission method. The present embodiment is another implementation of operation 102 in the first embodiment and operation 202 in the second embodiment. An exemplary flow of the implementation is as shown in FIG. 9.

At 501, in response to detecting that a message of a timely type is an instruction for synchronous operation, a synchronization moment between the first terminal and the second terminal is acquired.

In some exemplary implementations, the instruction for synchronous operation may be an instruction indicating a periodic operation, for example, a receiving/sending switching operation of an antenna device needs to be completely synchronized with an aviation device, the receiving/sending switching operation in the field of communications mostly has requirements for periodicity, and the aviation terminal device and the antenna device need to simultaneously control power-on/power-off of respective power amplifiers or simultaneously control switching of respective receiving/sending switches, thereby ensuring a normal communication function. The instruction for synchronous operation may be an instruction for controlling power-on/power-off of a power amplifier, and may alternatively be an instruction for controlling switching of a receiving/sending switch of an antenna. For another example, in a case where it is detected that the message of the timely type is an instruction for controlling a power amplifier, then a synchronization moment for synchronous operation between the first terminal and the second terminal is acquired.

At 502, the message of the timely type is transmitted to the second terminal within the transmission protect period according to a preset advance duration and the synchronization moment, so that the second terminal executes an operation corresponding to the message of the timely type at the synchronization moment.

In some exemplary implementations, the advance duration may be preset, and the advance duration may be determined according to the duration in which the second terminal completely parses the message. For example, in a case where the duration for the first terminal to modulate the message of the timely type is 20 µs, a transmission delay of the message of the timely type is 242 µs, and a delay for the second terminal to parse the message of the timely type is 23 µs, then the advance duration=20 µs+242 µs+23 µs, that is, the advance duration is 285 µs. The first terminal may send the instruction for controlling a power amplifier at 285 µs before the synchronization moment, so that the moment at which the second terminal executes an operation is synchronous with the moment at which the first terminal executes an operation.

Since the antenna side does not have the ability to independently switch receiving and sending, by transmitting the message of the timely type in advance, the power-on/power-off operation of the power amplifier of the antenna device is completely synchronous with the aviation device.

According to the message transmission method in the present embodiment, an instruction for controlling a power amplifier is sent in advance before the synchronization moment, so that the second terminal may be accurately synchronized with the first terminal.

Figure 10:
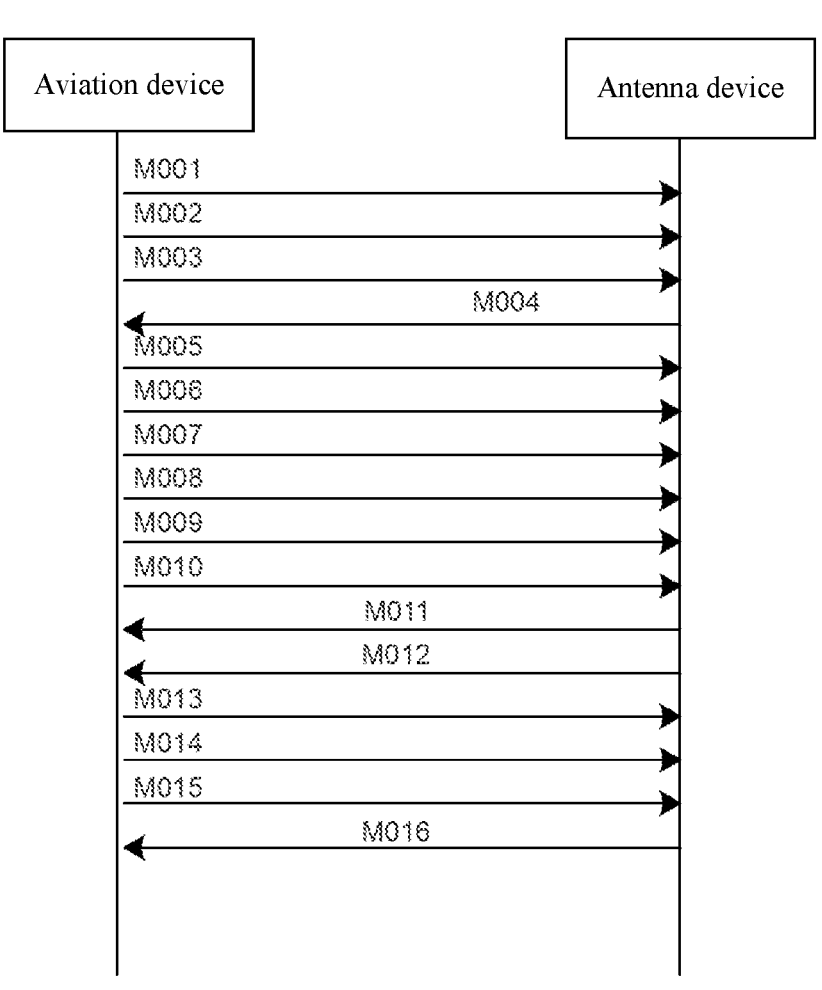
FIG. 10 is a schematic diagram of a communication process of transmitting a message between an aviation device and an antenna device in the message transmission method provided according to the fifth embodiment of the present disclosure.
Figure 11:
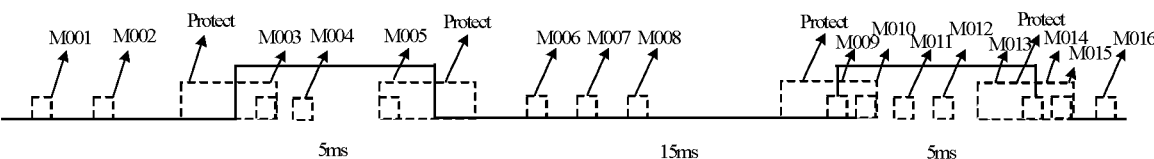
FIG. 11 is a sequence diagram of transmitting a message between the aviation device and the antenna device in the message transmission method provided according to the fifth embodiment of the present disclosure.

For ease of understanding, the message transmission process between the aviation device and the antenna device is introduced below in combination with FIGS. 10 and 11.

In the present embodiment, the power-on/power-off operation of the power amplifier of the antenna device needs to be completely synchronized with the aviation terminal device, and the power-on/power-off operation of the power amplifier of the antenna device is periodic. A sending cycle of a message is T=20 ms, the length of the transmission protect period is W=3 ms, and the total length of the transmission protect period in each transmission cycle is 6 ms. In consideration of an end-to-end time delay, the time delay mainly includes a sending end modulation time delay of 20 µs, a transmission time delay of 242 µs, and a receiving end parsing time delay of 23 µs, i.e. a total time delay of 285 µs. Therefore, each power-on/power-off message of the power amplifier of the antenna device is sent in advance of 285 µs. The term Protect in FIG. 11 represents a transmission protect period.

At M001, the aviation device sends, to the antenna device, an instruction for controlling the power amplifier to be powered on.

At M002, the aviation device sends a handshake request message.

At M003, the aviation device sends a start instruction to the antenna device.

At M004, the antenna device sends a handshake response message.

At M005, the aviation device sends an end instruction to the antenna device.

At M006, the aviation device sends a state query message to the antenna device.

At M007, the aviation device sends an angle query message to the antenna device.

At M008, the aviation device sends an angle control message to the antenna device.

At M009, the aviation device sends, to the antenna device, an instruction for controlling the power amplifier to be powered on.

At M010, the aviation device sends a start instruction to the antenna device.

At M011, the antenna device sends a state reporting message to the antenna device.

At M012, the antenna device sends an angle reporting message to the antenna device.

At M013, the aviation device sends an end instruction to the antenna device.

At M014, the aviation device sends, to the antenna device, an instruction for controlling the power amplifier to be powered off.

At M015, the aviation device sends a start instruction to the antenna device.

At M016, the antenna device sends an angle update message to the antenna device.

Figure 12:
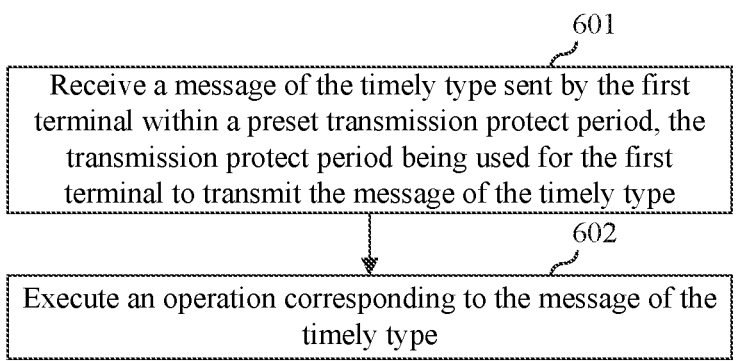
FIG. 12 is a flowchart of a message transmission method provided according to a sixth embodiment of the present disclosure.

A sixth embodiment of the present disclosure relates to a message transmission method performed by a second terminal, wherein a half-duplex communication mode is used between the second terminal and a first terminal. A flow of the message transmission method is as shown in FIG. 12.

At 601, a message of a timely type sent by the first terminal is received within a preset transmission protect period, wherein the transmission protect period is used for the first terminal to transmit the message of the timely type, and a message type includes: the timely type and a temporary type.

In some exemplary implementations, the second terminal receives the message of the timely type sent by the first terminal, and after receiving the message of the timely type, the second terminal may decode the message of the timely type, acquire the type of the received message of the timely type, and may preferentially process an operation corresponding to the message of the timely type (i.e., process an operation corresponding to the message of the timely type first). For example, in a case where the message of the timely type is instruction information for powering on the power amplifier, then the second terminal preferentially performs a power-on operation on the power amplifier (i.e., performs a power-on operation on the power amplifier first).

At 602, an operation corresponding to the message of the timely type is executed.

In some exemplary implementations, in a case where the received message of the timely type is a start instruction, then feedback information is sent to the first terminal within a period between two adjacent transmission protect periods. The feedback information may include: state information of the second terminal, etc. For example, when the second terminal is an antenna device, the feedback information may include antenna device state information, e.g. information such as temperature and antenna angle, etc.

The first terminal acquires an end moment of the transmission protect period and a transmission duration of the start instruction, and starts to transmit the start instruction at a moment which is a second preset duration before the end moment of the corresponding transmission protect period, so that the transmission of the start instruction is completed at the end of the transmission protect period. For example, in a case where the transmission duration of the start instruction is a, and the end time of the transmission protect period is tb, then the moment at which the start instruction is transmitted is tb-a.

As the transmission of the start instruction is completed at the end of the transmission protect period, it may be ensured that the transmission of the start instruction in the transmission protect period will not occupy too much duration in the transmission protect period.

In a case where an end instruction is received, the transmission of the feedback information is stopped, wherein the end instruction is sent by the first terminal at a start moment of the current transmission protect period.

In some exemplary implementations, after receiving the information transmitted by the second terminal, the first terminal generates the end instruction, wherein the end instruction is used for instructing the second terminal to stop transmitting information; and in a case where the end instruction is received within a next transmission protect period, the second terminal stops transmitting information to the first terminal.

The first terminal transmits the end instruction at the start of the transmission protect period, so that other messages with high priority levels may be transmitted in the remaining duration in the transmission protect period, without affecting message transmission of the first terminal.

In the message transmission method in the present disclosure, a message type of a message to be transmitted is acquired, wherein the message type includes a timely type and a temporary type; in response to determining that the message to be transmitted is a message of the timely type, a corresponding transmission protect period is allocated for the message of the timely type, and the message of the timely type is preferentially transmitted to the second terminal within the corresponding transmission protect period. As the message of the timely type has the corresponding transmission protect period, the message of the timely type exclusively occupies the transmission protect period, ensuring timely transmission of the message of the timely type to the second terminal, so that the second terminal may execute an operation corresponding to the message of the timely type in time, thereby realizing accurate control of the first terminal on the second terminal. Moreover, a half-duplex communication mode is used between the first terminal and the second terminal, that is, there is only one communication link between the first terminal and the second terminal, thereby saving communication links. In the half-duplex communication mode, the timeliness and accuracy of transmission of the message of the timely type are ensured, and application scenarios of the half-duplex communication mode are increased.

A seventh embodiment of the present disclosure relates to a terminal, and the structural block diagram of the terminal is as shown in FIG. 13. The terminal includes: at least one processor 701, and a memory 702 in communication connection with the at least one processor 701. The memory 702 stores instructions executable by the at least one processor 701, and the instructions, when being executed by the at least one processor 701, cause the at least one processor 701 may execute the message transmission methods.

The memory and the processor are connected by using a bus, the bus may include any number of interconnected buses and bridges, and the bus links various circuits of the one or more processors and the memory together. The bus may also link various other circuits together, such as peripheral devices, voltage regulators and power management circuits, which are all well known in the art and therefore are not further described herein. A bus interface provides an interface between the bus and a transceiver. The transceiver may be one element and may also be multiple elements, such as multiple receivers and senders, which provide units for communicating with various other apparatuses over a transmission medium. Data processed by the processor is transmitted on a wireless medium via an antenna, and further the antenna further receives data and transmits the data to the processor.

The processor is responsible for managing the bus and common processing, and may also provide various functions, including timely, peripheral interfaces, voltage regulation, power management, and other control functions. And the memory may be used to store data used by the processor when executing operations.

An eighth embodiment of the present disclosure relates to a computer-readable storage medium on which a computer program is stored, wherein the computer program, when being executed by a processor, causes the processor to execute the message transmission methods.

A person having ordinary skill in the art may understand that all or some operations of the methods in the embodiments may be completed by a program instructing relevant hardware. The program is stored in a storage medium, and includes several instructions for instructing a device (which may be a single chip microcomputer, a chip, etc.) or a processor to execute all or some operations of the methods according to various embodiments of the present disclosure. Moreover, the storage medium comprises: media such as a USB flash disk, a removable hard disk, a Read-Only Memory (ROM), a Random Access Memory (RAM), a magnetic disk, or an optical disk, etc. which may store program codes.

A person having ordinary skill in the art may understand that the various embodiments are exemplary embodiments for implementing the present disclosure, and in practical applications, various changes to the embodiments may be made in form and details without departing from the spirit and scope of the present disclosure.

What is claimed is:

1. A message transmission method performed by a first terminal, wherein a half-duplex communication mode is used between the first terminal and a second terminal, and the method comprises:

acquiring a message type of a message to be transmitted, wherein the message type comprises: a timely type and a temporary type;

in response to determining that the message to be transmitted is a message of the timely type, allocating a corresponding transmission protect period for the message of the timely type, and preferentially transmitting the message of the timely type to the second terminal within the transmission protect period, so that the second terminal executes an operation corresponding to the message of the timely type, wherein the transmission protect period is used for transmitting the message of the timely type; and in response to determining that the message to be transmitted is a message of the temporary type, acquiring a sending moment of the message of the temporary type, wherein the sending moment is within a period between a current transmission protect period and a next transmission protect period; acquiring a threshold moment which is a first preset duration before a start moment of the next transmission protect period; and determining whether the sending moment is before the threshold moment, in response to determining that the sending moment is before the threshold moment, transmitting the message of the temporary type at the sending moment, otherwise, adjusting the sending moment to be after the next transmission protect period.

2. The message transmission method according to claim 1, wherein before acquiring the threshold moment which is the first preset duration before the start moment of the next transmission protect period, the method further comprises:
　acquiring a transmission duration of the message of the temporary type; and
　determining a duration greater than or equal to the transmission duration as the first preset duration.

3. The message transmission method according to claim 1, wherein acquiring the sending moment of the message of the temporary type comprises:
　in response to detecting that a current transmission link is occupied, acquiring transmission priority levels of messages of the temporary type, and determining messages of the temporary type to be sent in a period between the current transmission protect period and the next transmission protect period according to a descending order of the transmission priority levels, and acquiring sending moments of the messages of the temporary type to be sent, and buffering other messages of the temporary type of which the sending moments have not been determined in a storage database; and
　in response to detecting that the current transmission link is empty and the storage database is empty, directly determining that the sending moment of the message of the temporary type is within the period between current transmission protect period and the next transmission protect period.

4. The message transmission method according to claim 1, wherein the method further comprises:
　in response to detecting that a current transmission link is empty and a storage database is empty, generating a start instruction for instructing the second terminal to start transmitting information to the first terminal, wherein the storage database is used for buffering messages of the temporary type; and
　after a second preset duration apart from a moment of sending the start instruction, generating an end instruction for instructing the second terminal to stop transmitting information.

5. The message transmission method according to claim 4, wherein the method further comprises following operations performed in a case where the end instruction is generated:
　transmitting the end instruction at a start moment of the current transmission protect period.

6. The message transmission method according to claim 4, further comprising:
　starting transmitting the start instruction at a moment which is a third preset duration before an end moment of the corresponding transmission protect period, wherein the third preset duration is equal to a transmission duration of the start instruction.

7. The message transmission method according to claim 4, wherein the second preset duration is a duration in which the first terminal receives information transmitted by the second terminal, or is set to a maximum duration apart from the start moment of a next transmission protect period.

8. The message transmission method according to claim 1, wherein preferentially transmitting the message of the timely type to the second terminal within the transmission protect period comprises:
　in response to detecting that the message of the timely type is a synchronous operation instruction, acquiring a synchronization moment between the first terminal and the second terminal; and
　transmitting the synchronous operation instruction to the second terminal within the transmission protect period according to a preset advance duration and the synchronization moment, so that the second terminal executes an operation corresponding to the synchronous operation instruction at the synchronization moment.

9. The message transmission method according to claim 1, wherein a frame structure of the message of the timely type comprises: a message header, message content and a message trailer; and
　a frame structure of the message of the temporary type comprises: a message header, a scramble sequence, a message type, message content, a check value and a message trailer.

10. A non-transitory computer-readable storage medium, on which a computer program is stored, wherein the computer program, when being executed by a processor, causes the processor to execute the message transmission method according to claim 1.

11. The message transmission method according to claim 1, wherein acquiring the message type of the message to be transmitted comprises:
　acquiring the message type indicated by a software high layer.

12. The message transmission method according to claim 1, wherein acquiring the message type of the message to be transmitted comprises:
　determining the message type according to a message header of the message to be transmitted, wherein the transmission type is marked in the message header of the message to be transmitted.

13. The message transmission method according to claim 1, wherein acquiring the message type of the message to be transmitted comprises:
　identifying the message type according to a frame structure of the message to be transmitted, wherein a message of the timely type has a frame structure different from a frame structure of a message of the temporary type.

14. The message transmission method according to claim 1, wherein acquiring the message type of the message to be transmitted comprises:
　determining the message type of the message to be transmitted as the timely type in a case where the message to be transmitted is a periodic message.

15. The message transmission method according to claim 1, wherein in a case where the message of the timely type comprises a periodic message, allocating the corresponding transmission protect period for the message of the timely type comprises:
　allocating the transmission protect period for the message of the timely type according to periodicity of the message of the timely type.

16. The message transmission method according to claim 1, wherein a time length of the transmission protect period is determined according to a message length and the number of messages of the timely type, so that the time length of the transmission protect period is greater than total sending time of the messages of the timely type.

17. The message transmission method according to claim 1, wherein the first preset duration is a maximum duration of transmission of the message of the temporary type.

18. The message transmission method according to claim 1, wherein a transmission duration of the message of the temporary type is acquired; and a duration greater than or equal to the transmission duration is determined as the first preset duration.

19. A first terminal, comprising: at least one processor; and a memory in communication connection with the at least one processor;

wherein the memory stores instructions executable by the at least one processor, and the instructions, when being executed by the at least one processor, cause the at least one processor to:

acquire a message type of a message to be transmitted, wherein the message type comprises: a timely type and a temporary type;

in response to determining that the message to be transmitted is a message of the timely type, allocate a corresponding transmission protect period for the message of the timely type, and preferentially transmit the message of the timely type to a second terminal within the transmission protect period, so that the second terminal executes an operation corresponding to the message of the timely type, wherein the transmission protect period is used for transmitting the message of the timely type, wherein a half-duplex communication mode is used between the first terminal and the second terminal; and in response to determining that the message to be transmitted is a message of the temporary type, acquire a sending moment of the message of the temporary type, wherein the sending moment is within a period between a current transmission protect period and a next transmission protect period; acquire a threshold moment which is a first preset duration before a start moment of the next transmission protect period; and determine whether the sending moment is before the threshold moment, in response to determining that the sending moment is before the threshold moment, transmit the message of the temporary type at the sending moment, otherwise, adjust the sending moment to be after the next transmission protect period.

* * * * *